(12) United States Patent
Ivanov et al.

(10) Patent No.: US 10,417,199 B2
(45) Date of Patent: Sep. 17, 2019

(54) DISTRIBUTED LOCKS FOR CONTINUOUS DATA PROCESSING AND SCHEMA ADMINISTRATION OF A DATABASE

(71) Applicant: VMware, Inc., Palo Alto, CA (US)

(72) Inventors: Antoni Ivanov, Sofia (BG); Denitsa Gencheva, Sofia (BG); Marin Nozhchev, Sofia (BG)

(73) Assignee: VMware, Inc., Palo Alto, CA (US)

( * ) Notice: Subject to any disclaimer, the term of this patent is extended or adjusted under 35 U.S.C. 154(b) by 142 days.

(21) Appl. No.: 15/651,823

(22) Filed: Jul. 17, 2017

(65) Prior Publication Data

US 2019/0018865 A1    Jan. 17, 2019

(51) Int. Cl.
  *G06F 16/20*    (2019.01)
  *G06F 16/21*    (2019.01)
  *G06F 16/25*    (2019.01)
  *G06F 16/23*    (2019.01)

(52) U.S. Cl.
  CPC ........ *G06F 16/212* (2019.01); *G06F 16/2343* (2019.01); *G06F 16/2379* (2019.01); *G06F 16/258* (2019.01)

(58) Field of Classification Search
  None
  See application file for complete search history.

(56) References Cited

U.S. PATENT DOCUMENTS

| | | | |
|---|---|---|---|
| 2009/0037462 A1* | 2/2009 | Pearson | G06F 16/2343 |
| 2010/0191884 A1* | 7/2010 | Holenstein | G06F 11/2094 710/200 |
| 2014/0181342 A1* | 6/2014 | Antonopoulos | G06F 9/466 710/200 |
| 2015/0379058 A1* | 12/2015 | Chen | G06F 16/23 707/756 |

* cited by examiner

*Primary Examiner* — Jau Shya Meng
(74) *Attorney, Agent, or Firm* — Patterson + Sheridan, LLP

(57) ABSTRACT

Distributed locks (e.g., among a plurality of database management services) can be used for accessing a database to ensure data consistency in the database during concurrent continuous data processing and schema or data administration of the database. An exclusive lock of the database may not be held for all operations of an extract, transform, load (ETL) process to load data from a data source into the database. Schema changes that occur to a database schema of the database in the middle of the ETL process when the exclusive lock is not held can be resolved.

20 Claims, 3 Drawing Sheets ers relate to performing a conflict resolution process on the ETL process as discussed.

DISTRIBUTED LOCKS FOR CONTINUOUS DATA PROCESSING AND SCHEMA ADMINISTRATION OF A DATABASE

BACKGROUND

Databases may be used to organize collections of data. Further, analytics systems (e.g., cloud based data analytics systems) may be used to analyze the data (e.g., operational statistics, metadata, parameters, etc.) captured in the database. In certain cases, a single database may store data from a number of different data sources (e.g., homogenous or heterogeneous data sources, such as applications, servers, live data streams, virtual computing instances, etc.). For example, it may be desirable to correlate data from different data sources when performing analytics on the data, which may be easier to perform if the data from the multiple data sources is stored in the same database.

The data from the various data sources may be extracted from the data sources, transformed, and loaded into the database on a continuous basis using continuous extract, transform, load (ETL) processes as the various data sources may continually produce new data, remove data, update data, etc. For example, in an extract operation, data is extracted from the data source. Further, in a transform operation, a series of rules or functions are applied to the extracted data so it can be loaded into the target database. For example, the extracted data may be transformed by selecting only certain columns of data to load in the database, encoding the data into other values, translating values, calculating values based on the data, etc. so that the transformed data matches with a database schema (e.g., structure of the database, such as tables (including rows and columns), fields, relationships, functions, etc.) of the database and can be properly loaded in the database. In the load operation, the transformed data is loaded into the database itself.

Further, the database schema of the database may be dynamic and change during operation of the database. For example, new tables and columns may be created/removed in the database as data from new data sources is added to or old data sources removed from the database. Since the database schema of the database may change during operation of the database data consistency may need to be ensured, such that data entered into the database from ETL processes matches the current database schema and not an outdated database schema.

DETAILED DESCRIPTION

Figure 1:
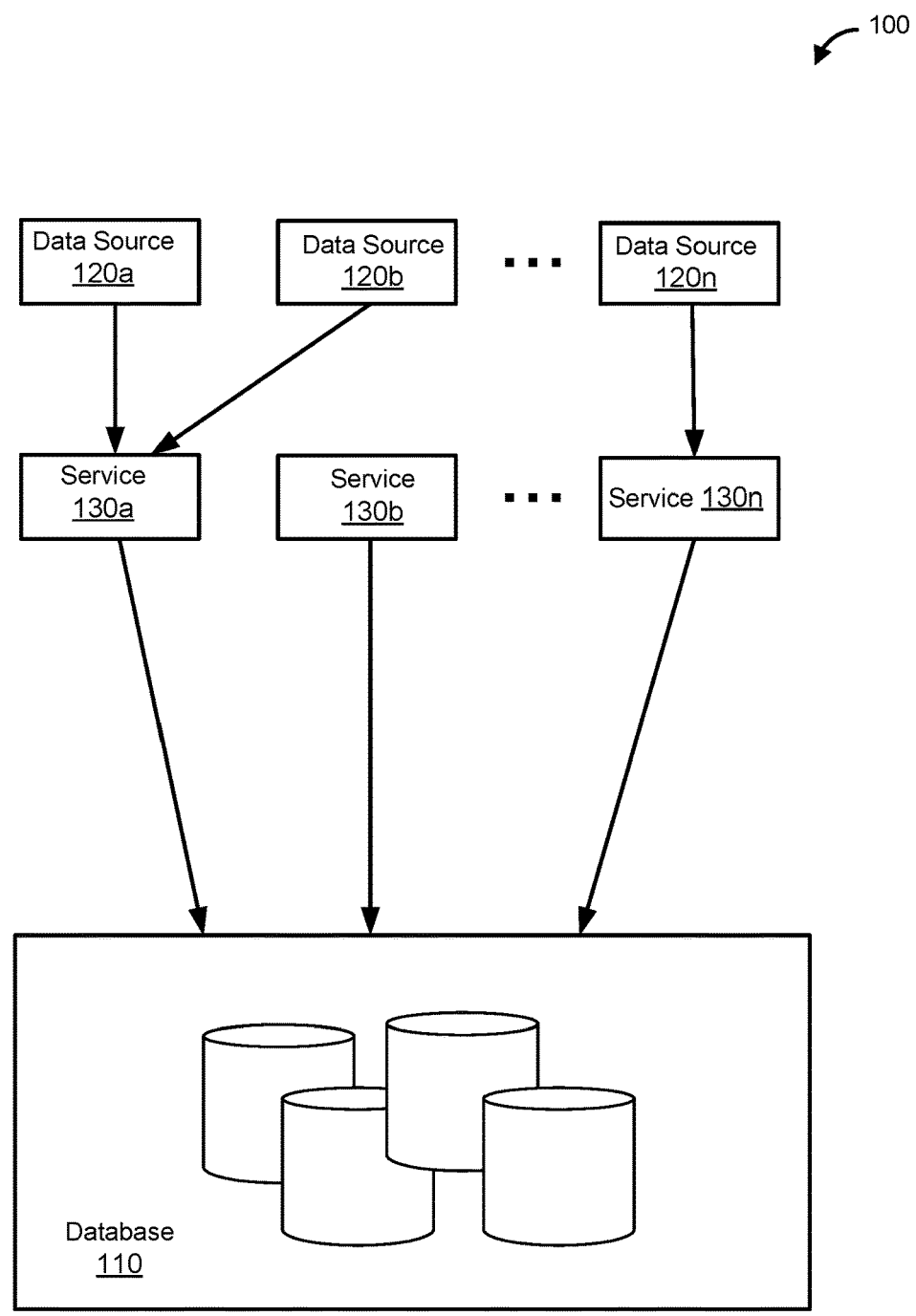
FIG. 1 illustrates components of an example system in which an embodiment may be implemented.

Embodiments presented herein relate to techniques for using distributed locks (e.g., among a plurality of database management services that may be manual services (e.g., directed by a human operating a device) or automatic services) for accessing a database to ensure data consistency in the database. In certain embodiments, ETL of data from data sources into the database may occur independently of schema changes to the database. For example, one or more database management services (e.g., operating on or using one or more database management devices) may concurrently perform ETL of data into the database while one or more database management services perform schema management operations (e.g., to change the schema of the database) or other administrative operations. Accordingly, certain embodiments herein relate to a strategy of using exclusive locks of the database in a manner that differs from traditional optimistic locking to ensure data consistency. An exclusive lock of the database means that during the time the lock is held by a database management service no other entity (e.g., data management service) can change the database (e.g., the entire database or a portion of the database (e.g., table, set of tables, column, set of columns, etc.) for which the exclusive lock is held). An optimistic lock of the database means that during the time the lock is held by a database management service, another entity (e.g., data management service) can still change the database. In particular, with an optimistic lock, for a transaction, the database management service first determines a version (e.g., timestamp) associated with a record where data is to be loaded in the database. Then, just before the database management service loads the data in the record, it determines the version again, and determines if the version has changed since the initial determination. If the version has not changed, the database management service loads the data in the record. If the version has changed, the database management service rolls back the transaction and starts over.

For example, in certain embodiments, multiple database management services may each be associated with one or more data sources (also referred to as "collectors") and configured to perform ETL of data from the one or more data sources into the database. Further, multiple database management services may each be configured to perform schema management operations on the database. Accordingly, in certain embodiments, loading of data into the database and management of the database may be distributed across multiple database management services. The multiple database management services may run on or use a plurality of different physical devices. Such distribution of ETL and management operations across multiple devices may advantageously help distribute processing and computing load across multiple devices. Each database management service may be configured to hold an exclusive lock of the database (e.g., the entire database or a portion of the database (e.g., table, set of tables, column, set of columns, etc.) for which the exclusive lock is held) at certain times as discussed herein to ensure data consistency in the database. In certain embodiments, the database management service is configured to hold the exclusive lock for a table of the database for which schema changes or the ETL process is performed as discussed. Accordingly, though certain embodiments are described as holding an exclusive lock on a database, it should be understood that this could refer to holding an exclusive lock on the entire database or a portion of the database that is being modified.

Further, embodiments herein relate to resolving schema changes that occur to a database schema in the middle of an ETL process. For example, in certain embodiments, an exclusive lock is not held for an entire ETL process, and accordingly, schema changes to the database schema may occur during the ETL process. Accordingly, certain embodiments relate to resolving the schema changes by performing resolution operations on data before loading the data into the database.

FIG. 1 illustrates components of a system 100 in which an embodiment may be implemented. As shown, system 100 includes a database 110, multiple data sources 120 (e.g., data sources 120a, 120b, . . . 120n), and multiple database management services 130 (e.g., database management services 130a, 130b, . . . 130n).

Database 110 may include any suitable non-volatile data store for organizing and storing data from the multiple data sources 120. For example, in some embodiments, database 110 may be implemented as software-defined storage such as VMware Virtual SAN that clusters together server-attached hard disks and/or solid state drives (HDDs and/or SSDs), to create a flash-optimized, highly resilient shared datastore designed for virtual environments. In some embodiments, database 110 may be implemented as one or more storage devices, for example, one or more hard disks, flash memory modules, solid state disks, and optical disks (e.g., in a computing device, server, etc.). In some embodiments, database 110 may include a shared storage system having one or more storage arrays of any type such as a network-attached storage (NAS) or a block-based device over a storage area network (SAN). In some embodiments, database 110 is a massively parallel processing (MPP) SQL database backed by a distributed file system (DFS), such as a Hadoop DFS (HDFS). In some embodiments the data files are store in parquet format on the HDFS. Database 110 may store data from multiple data sources 120 according to a database schema. Further, the database schema of database 110 may be dynamic.

Each data source 120 may correspond to one or more physical devices (e.g., servers, computing devices, etc.) or virtual devices (e.g., virtual computing instances, containers, virtual machines (VMs), etc.). For example, a physical device may include hardware such as one or more central processing units, memory, storage, and physical network interface controllers (PNICs). A virtual device may be a device that represents a complete system with processors, memory, networking, storage, and/or BIOS, that runs on a physical device. For example, the physical device may execute a virtualization layer that abstracts processor, memory, storage, and/or networking resources of the physical device into one more virtual devices. Each data source 120 may generate data that is ETL into the database 110.

Each database management service 130 may be a process or application executing on one or more physical devices or virtual devices. In certain embodiments, a database management service 130 may execute on the same device as a data source 120. In certain embodiments, a database management service 130 may execute on a separate device from the data source 120. As discussed, a database management service 130 may be an automatic service, or a manual service (e.g., directed by a human).

Each database management service 130 may be coupled (e.g., via a network, as running on the same device, etc.) to one or more data sources 120 and to the database 110 (e.g., via a network). Further, each database management service 130 may be configured to perform ETL of data from the one or more data sources 120 coupled to the database management service 130 into database 110. For example, a given database management service 130 may continuously (e.g., periodically, in real time, etc.) perform ETL of data from one or more data sources 120 into database 110.

Further, each database management service 130 may be configured to perform schema management operations (e.g., to change the schema of the database 110) or other administrative operations on database 110. For example, if new data sources 120 are enabled and coupled to a database management service 130, the database management service 130 may update a database schema of the database 110, such as by adding new tables or columns to the database schema for the data from the new data source 120.

As discussed, the multiple database management services 130 may operate in parallel, and accordingly attempt to perform operations (e.g., ETL, schema changes, etc.) on database 110 concurrently. In order to ensure data consistency in database 110, each database management service 130 may be configured to hold an exclusive lock of database 110 while performing certain actions as discussed herein.

In certain embodiments, a database management service 130 is configured to hold an exclusive lock of database 110 during the entire time that the database management service 130 performs a schema management operation or administrative operation on database 110. Accordingly, the data in database 110 does not change during a schema management operation or administrative operation, so no errors should occur during the operation. For example, database management service 130 may perform a schema management operation such as dropping a column from a table in database 110. The database 110, in one example, may not support a single statement or command to drop a column. Accordingly, database management service 130 may implement an operation for dropping the column by performing several commands including creating a new table with the desired schema (i.e., without the column), moving the existing data to the new table, and then removing the old table. To ensure data consistency while performing all of the commands to implement the operation, database management service 130 may hold an exclusive lock of database 110 for the entire operation.

In certain embodiments, the database management service 130 is configured to hold an exclusive lock of database 110 only during certain portions of the ETL process.

As discussed, database management services 130 may be continuously performing ETL of data from one or more data sources 120 into database 110. For example, ETL of data may be performed in batches at a time by a database management service 130 where batches of data from a given data source 120 are ETL into database 110 at a time for each ETL process performed. Batches of data from a given data source 120 may be continuously or immediately processed one after another. Accordingly, if an exclusive lock is held by database management service 130 for each batch of data to ETL into database 110 one after another, the database management service 130 may practically constantly hold an exclusive lock of database 110, preventing other operations from being performed.

Further, each of the database management services 130 may operate in parallel to perform ETL of batches of data (e.g., in the same table) in database 110 from multiple data sources 120 in parallel. Requiring an exclusive lock be held each time ETL is performed, therefore, would mean that ETL processes could only be performed serially, and not in parallel, which would degrade performance.

Accordingly, certain embodiments described herein relate to a database management service 130 holding an exclusive lock for only portions of an ETL process for performing ETL of a batch of data from a data source 120 into database 110. Accordingly, other ETL processes, schema management operations, or administrative operations may be performed on database 110 by other database management services 130 in parallel with the ETL process while an exclusive lock is not held for the ETL process.

Figure 2:
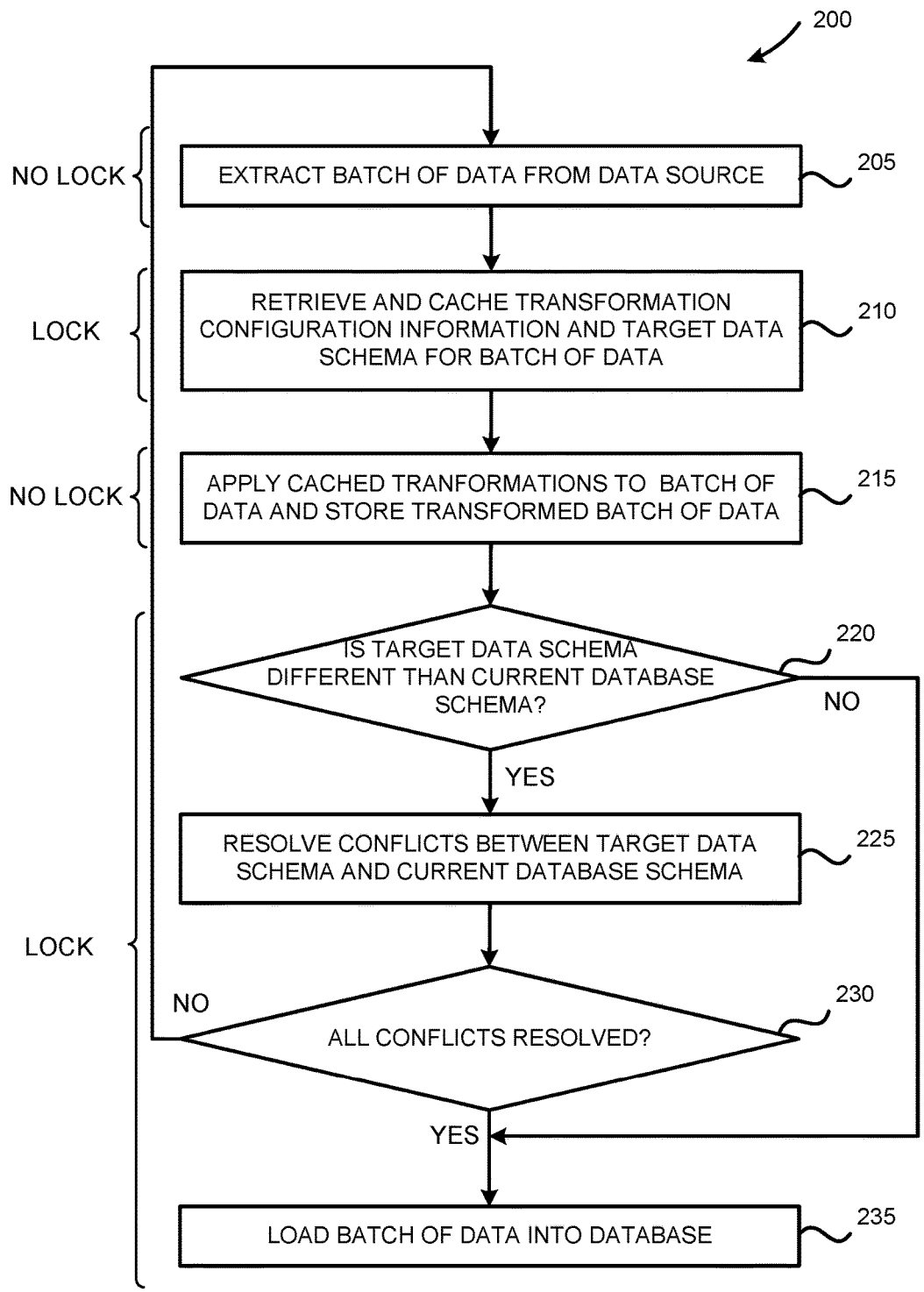
FIG. 2 illustrates example operations for performing ETL of a batch of data from a data source into a database by a database management service, in accordance with some embodiments.

FIG. 2 illustrates example operations 200 for performing ETL of a batch of data from a data source 120 into a database 110 by a database management service 130, in accordance with some embodiments.

At 205, database management service 130 extracts the batch of data from data source 120 and holds the data locally (e.g., on a storage (e.g., non-volatile memory) accessible by database management service 130). The database management service 130 does not hold an exclusive lock of database 110 while extracting the batch of data from data source 120. Accordingly, information in database 110 may change during the extraction, however, this should not impact the ETL process as database management service 130 has not yet done anything with the extracted data.

At 210, database management service 130 acquires and holds an exclusive lock while retrieving configuration information about the transformation to apply to the batch of data from the data source 120 and defining the target data schema for the batch of data, and caching the configuration information and target data schema locally (e.g., in a memory (e.g., volatile memory) or storage (e.g., a non-volatile memory) accessible by database management service 130). For example, the configuration information about the transformation may be information that indicates which transform operations should be applied to the batch of data in order to transform the data to match the target data schema. The target data schema may be information defining the portions of the current database schema (e.g., tables and columns) (or the entire current database schema) (e.g., at a first time) in which the batch of data is to be stored in the database 110 based on the current database schema of the database 110. For example, the configuration information about the transformation may be determined by the database management service 130 based on the type of data (e.g., particular statistics, parameters, etc.) in the batch of data, and information configured at the database management service 130 that defines how that particular type of data needs to be transformed to match the target data schema. For example, the batch of data may include information about a number of sales for different items and a quantity price for each item. The target data schema may have a column indicating total sales for a given item. Accordingly, the configuration information about the transformation may indicate that the number of sales should be multiplied by the quantity price for each item to generate total sales for each item, which would then be placed in the column indicating total sales for a given item. The database management service 130 may further retrieve information about the current database schema from database 110 to determine the target data schema.

Since database management service 130 holds the exclusive lock at 210, no changes are made to the database 110 at that time including the database schema. Accordingly, the determined target data schema is ensured to match the determined configuration information. Further, 210 may take only a few seconds to perform, meaning holding the exclusive lock of database 110 during 210 may not hold up parallel processing at database 110 for a significant time period. Database management service 130 releases the exclusive lock of database 110 after performing 210.

At 215, database management service 130 applies the cached transformations indicated by the configuration information to the batch of data stored locally at database management service 130 and stores the transformed batch of data in a staging location (e.g., locally in the storage accessible by data management service 130). The database management service 130 does not hold an exclusive lock of database 110 while applying the transformations and storing the transformed batch of data. For example, 215 may take a significant amount of time (e.g., minutes to hours), and therefore holding an exclusive lock would prevent other database management services 130 from performing operations on database 110 in parallel.

Since database management service 130 does not hold an exclusive lock of database 110 during 215, it is possible that the database schema of database 110 may by updated (e.g., by another database management service 130) while database management service 130 performs 215. Accordingly, the cached target data schema at database management service 130 may no longer match the updated database schema of database 110, and further the stored transformed batch of data may no longer correspond to the updated database schema of database 110. Continuing the previous example, the transformed data may be total sales for a given item, which may have been determined by multiplying number of sales by the quantity price for each item as retrieved from data source 120. Further, the cached target schema may include a column indicating total sales for a given item. However, during 215, the database schema of database 110 may change, such as removing the column indicating total sales for items, and adding a column for number of sales for items. Therefore, the stored transformed batch of data can no longer be properly loaded into the database 110.

Accordingly, at 220, database management service 130 determines if the database schema of database 110 has been updated from the target data schema. Database management service 130 holds an exclusive lock of database 110 during 220, such as to ensure no other changes are made to database 110, including schema changes, while the determination is made so that the determination is accurate. For example, database management service 130 again retrieves information about the current database schema from database 110 (e.g., at a second time after the first time). Database management service 130 may compare the cached target data schema to the current database schema. If the target data schema matches (e.g., includes the same column, tables, etc.) the current database schema, database management service 130 determines the database schema of database 110 has not been updated, and operations 200 continue to 235. If the target data schema does not match the current database schema, database management service 130 determines the database schema of database 110 has been updated, operations continue to 225.

At 225, database management service 130 continues to hold the exclusive lock of database 110 and resolves conflicts between the target data schema and the updated database schema. For example, database management service 130 may further automatically transform the stored transformed batch of data to match the updated database schema. In particular, in some embodiments, database management service 130 updates the transformed batch of data to include data for columns that intersect between the target data schema and the updated database schema. In one example, if a column is added to the updated database schema and the transformed batch of data does not have information for that column, the transformed batch of data is further transformed to include NULL values for the added column. In another example, if a column is dropped from the updated database schema and the transformed batch of data does have information for that column, the transformed batch of data is further transformed to remove the column as well. In a further example, if a column (e.g., column type) is changed in the updated database schema and the transformed batch of data has different information for that column, the transformed batch of data is further transformed to change the data in the column to the updated type (e.g., change price of an item to price of an item plus tax, which adds the percentage tax to the item price using transform operations). In certain embodiments, if the updated database schema no longer includes a table for any of the transformed batch of data, the database management service 130 releases the exclusive lock of database 110 and the operations 200 end. More details of an example of the conflict resolution process of 225 are described with respect to FIG. 3.

At 230, database management service 130 continues to hold the exclusive lock of database 110 and determines if any conflicts between the target data schema and updated database schema could not be resolved at 225. For example, certain conflicts may not be able to be resolved automatically by database management service 130. In some embodiments, if a column is renamed or a predefined transformation operation is changed, database management service 130 may not be able to resolve such conflicts automatically. If any conflicts cannot be resolved, database management service 130 may start the ETL process over by releasing the exclusive lock of database 110 and returning to 205. If all conflicts are resolved, database management service 130 continues to 235.

At 235, database management service 130 continues to hold the exclusive lock of database 110 (from 220 or 230) and loads the batch of data into database 110, thereby completing the ETL process for the batch of data. Database management service 130 releases the exclusive lock of database 110 after 235 is completed.

Steps 220-235 may take on the order of minutes to perform, meaning holding the exclusive lock of database 110 during 210 may not hold up parallel processing at database 110 for a significant time period.

Figure 3:
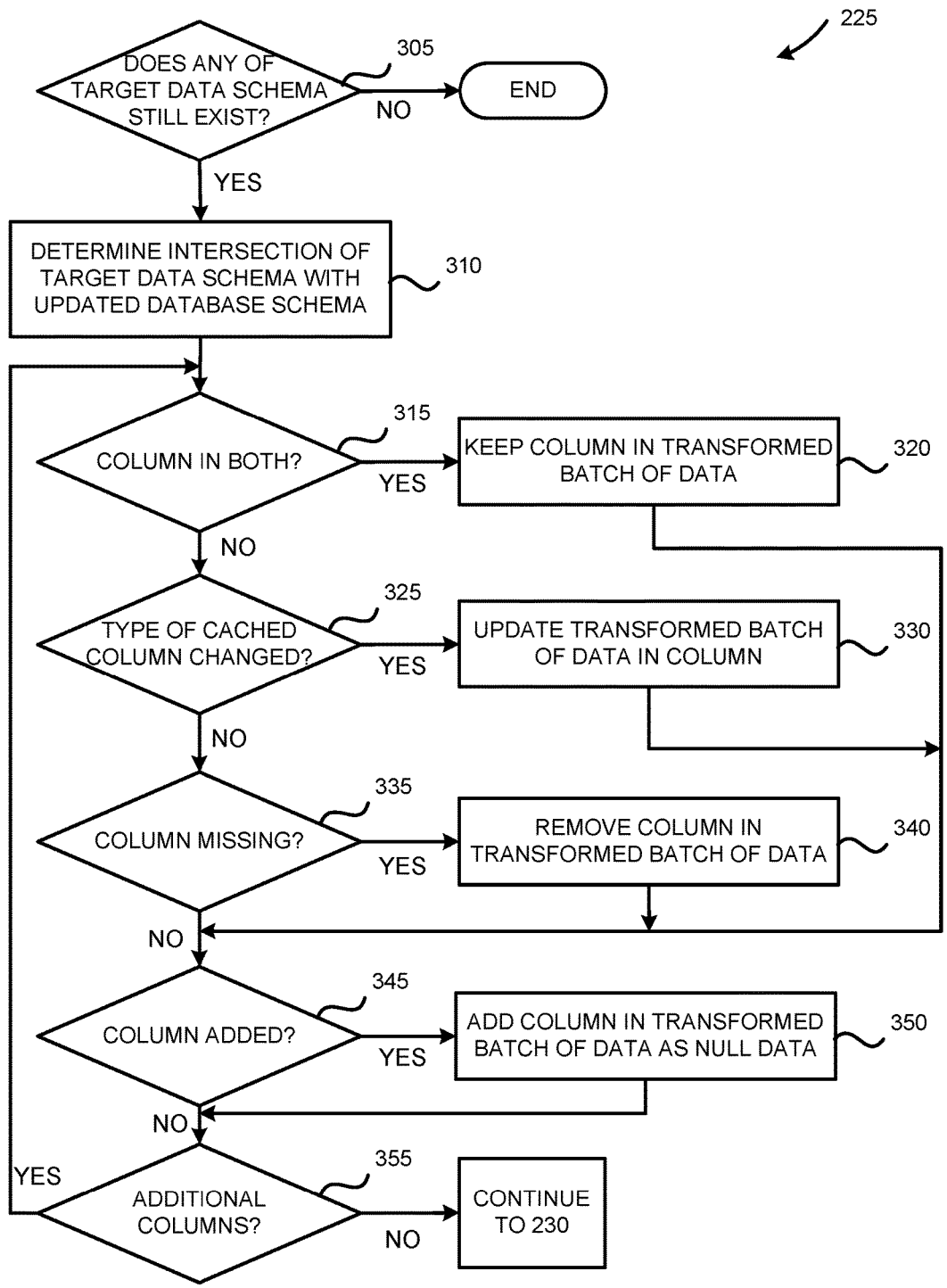
FIG. 3 illustrates example operations for performing the conflict resolution process of discussed with respect to FIG. 2, in accordance with some embodiments.

FIG. 3 illustrates example operations for performing the conflict resolution process of 225 discussed with respect to FIG. 2, in accordance with some embodiments.

At 305, database management service 130 determines if any of the target data schema (e.g., columns, tables, etc.) still exists in the updated database schema. If the target data schema does not exist in the updated database schema, database management service 130 ends operations 200, as discussed. If any of the target data schema does exist in the updated database schema, database management service 130 continues to 310.

At 310, database management service 130 determines an intersection between the target data schema and the updated database schema, such as based on types of columns, names of columns, and schema versions included in the target data schema and the updated database schema, the intersection including tables and columns from both the target data schema and the updated database schema.

At 315, for a column in the target data schema, database management service 130 determines if the column is in the intersection and still exists in the same manner in the updated database schema. If the column is in the intersection, operations continue to 320 where the column is kept in the transformed batch of data, and operations further continue to 345. If the column is not in the intersection, operations continue to 325.

At 325, for the same column in the target data schema, database management service 130 determines if a type of the column has changed in the updated database schema. If the column type has changed, operations continue to 330 where the transformed batch of data corresponding to the column is updated to match the new column type (e.g., by additional transforms as discussed), and operations further continue to 345. If the column type has not changed, operations continue to 335.

At 335, for the same column in the target data schema, database management service 130 determines if the column is missing in the updated database schema. If the column is missing, operations continue to 340 where the transformed batch of data corresponding to the column is removed, and operations further continue to 345. If the column is not missing, operations continue to 345.

At 345, for the same column in the target data schema, database management service 130 determines if an additional adjacent column has been added to the updated database schema. If a column is added, operations continue to 350 where a corresponding column is added to the transformed batch of data (and optionally filled with NULL data), and operations further continue to 355. If a column has not been added, operations continue to 355.

At 355, database management service 130 determines if any additional columns not processed exist in the target data schema. If no additional columns exist, operations continue to 230 as described with respect to FIG. 2. If additional columns exist, operations return to 315 to process the additional columns.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, VMs are used as an example for the virtual computing instances and hypervisors as an example for the hardware abstraction layer. As described above, each VM includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The computer readable media may be non-transitory. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A computer implemented method for loading data into a database, the method comprising:
  retrieving, by a computing system comprising at least one processor, information about a database schema of at least a portion of the database at a first time and transformation information about transformation operations to apply to the data based on the database schema at the first time while holding an exclusive lock of the at least the portion of the database;
  applying, by the computing system, the transformation operations to the data to generate transformed data while not holding the exclusive lock of the at least the portion of the database;
  performing, by the computing system, while holding the exclusive lock of the at least the portion of the database:
    retrieving information about the database schema of the at least the portion of the database at a second time;
    determining if the database schema at the first time is different than the database schema at the second time;
    based on determining the database schema at the first time is different than the database schema at the second time, updating the transformed data based on the database schema at the second time; and
    loading the updated transformed data into the at least the portion of the database.

2. The method of claim 1, further comprising extracting the data from a data source while not holding the exclusive lock of the at least the portion of the database.

3. The method of claim 1, further comprising storing the information about the database schema of the at least the portion of the database at the first time and the transformed data in a storage separate from the database.

4. The method of claim 1, wherein the database schema at the first time includes a column not included in the database schema at the second time, wherein updating the transformed data comprises removing the column from the transformed data.

5. The method of claim 1, wherein the database schema at the second time includes a column not included in the database schema at the first time, wherein updating the transformed data comprises adding the column to the transformed data.

6. The method of claim 5, further comprising adding NULL data to the column.

7. The method of claim 1, wherein the database schema at the first time includes a column that is changed in the database schema at the second time, and wherein updating the transformed data comprises updating the column in the transformed data.

8. The method of claim 1, further comprising performing multiple parallel operations with respect to the at least the portion of the database.

9. A non-transitory computer readable medium comprising instructions to be executed in a computer system, wherein the instructions when executed in the computer system perform a method for loading data into a database, the method comprising:
- retrieving information about a database schema of at least a portion of the database at a first time and transformation information about transformation operations to apply to the data based on the database schema at the first time while holding an exclusive lock of the at least the portion of the database;
- applying the transformation operations to the data to generate transformed data while not holding the exclusive lock of the at least the portion of the database;
- performing, while holding the exclusive lock of the at least the portion of the database:
  - retrieving information about the database schema of the at least the portion of the database at a second time;
  - determining if the database schema at the first time is different than the database schema at the second time;
  - based on determining the database schema at the first time is different than the database schema at the second time, updating the transformed data based on the database schema at the second time; and
  - loading the updated transformed data into the at least the portion of the database.

10. The non-transitory computer readable medium of claim 9, wherein the database schema at the first time includes a column not included in the database schema at the second time, wherein updating the transformed data comprises removing the column from the transformed data.

11. The non-transitory computer readable medium of claim 9, wherein the database schema at the second time includes a column not included in the database schema at the first time, wherein updating the transformed data comprises adding the column to the transformed data.

12. The non-transitory computer readable medium of claim 11, wherein the method further comprises adding NULL data to the column.

13. The non-transitory computer readable medium of claim 9, wherein the database schema at the first time includes a column that is changed in the database schema at the second time, and wherein updating the transformed data comprises updating the column in the transformed data.

14. The non-transitory computer readable medium of claim 9, wherein the method further comprises performing multiple parallel operations with respect to the at least the portion of the database.

15. A computer system comprising:
- a memory storing system software for the computer system; and
- a processor configured to execute the system software to perform a method for loading data into a database, the method comprising:
  - retrieving information about a database schema of at least a portion of the database at a first time and transformation information about transformation operations to apply to the data based on the database schema at the first time while holding an exclusive lock of the at least the portion of the database;
  - applying the transformation operations to the data to generate transformed data while not holding the exclusive lock of the at least the portion of the database;
  - performing, while holding the exclusive lock of the at least the portion of the database:
    - retrieving information about the database schema of the at least the portion of the database at a second time;
    - determining if the database schema at the first time is different than the database schema at the second time;
    - based on determining the database schema at the first time is different than the database schema at the second time, updating the transformed data based on the database schema at the second time; and
    - loading the updated transformed data into the at least the portion of the database.

16. The computer system of claim 15, wherein the database schema at the first time includes a column not included in the database schema at the second time, wherein updating the transformed data comprises removing the column from the transformed data.

17. The computer system of claim 15, wherein the database schema at the second time includes a column not included in the database schema at the first time, wherein updating the transformed data comprises adding the column to the transformed data.

18. The computer system of claim 17, wherein the method further comprises adding NULL data to the column.

19. The computer system of claim 15, wherein the database schema at the first time includes a column that is changed in the database schema at the second time, and wherein updating the transformed data comprises updating the column in the transformed data.

20. The computer system of claim 15, wherein the method further comprises performing multiple parallel operations with respect to the at least the portion of the database.

* * * * *